United States Patent
Kim et al.

(10) Patent No.: US 7,733,420 B2
(45) Date of Patent: Jun. 8, 2010

(54) JUDDER DETECTION APPARATUS, DE-INTERLACING APPARATUS USING THE SAME, AND DE-INTERLACING METHOD

(75) Inventors: Haeng-kang Kim, Suwon-si (KR); Young-ho Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1218 days.

(21) Appl. No.: 11/294,505

(22) Filed: Dec. 6, 2005

(65) Prior Publication Data
US 2006/0139485 A1    Jun. 29, 2006

(30) Foreign Application Priority Data
Dec. 28, 2004  (KR) .................. 10-2004-0113796

(51) Int. Cl.
*H04N 7/01*   (2006.01)
*H04N 5/21*   (2006.01)

(52) U.S. Cl. .............. 348/452; 348/449; 348/448; 348/615; 348/701; 348/910; 382/275

(58) Field of Classification Search ............... 348/449, 348/448, 452, 558, 441, 910, 615, 607, 619, 348/700, 701; 382/275, 272, 300
See application file for complete search history.

(56) References Cited

U.S. PATENT DOCUMENTS

| 5,339,109 | A  |   | 8/1994 | Hong |
| 5,682,205 | A  | * | 10/1997 | Sezan et al. ............ 348/452 |
| 5,689,305 | A  |   | 11/1997 | Ng et al. |
| 6,380,978 | B1 |   | 4/2002 | Adams |
| 6,515,706 | B1 |   | 2/2003 | Thompson |
| 6,628,341 | B1 |   | 9/2003 | Staley |
| 6,630,961 | B1 |   | 10/2003 | Shin |
| 7,489,350 | B2 | * | 2/2009 | De Haan et al. ......... 348/252 |
| 2002/0163595 | A1 |   | 11/2002 | Adams |
| 2003/0098924 | A1 |   | 5/2003 | Adams |

FOREIGN PATENT DOCUMENTS

| JP | 2001-313909 | 11/2001 |
| KR | 2003-10252 | 2/2003 |
| KR | 2003-82249 | 10/2003 |
| KR | 2004-62297 | 7/2004 |
| WO | WO 95/19682 A | 7/1995 |

\* cited by examiner

*Primary Examiner*—David L Ometz
*Assistant Examiner*—Jean W Désir
(74) *Attorney, Agent, or Firm*—Stanzione & Kim, LLP

(57) ABSTRACT

A judder detection apparatus, a de-interlacing apparatus using the judder detection apparatus, and a de-interlacing method. The judder detection apparatus includes a judder detector to detect whether a detected pattern that is similar to a judder pattern occurs using predetermined pixel values of even and odd fields sequentially input, a pattern detector to detect whether an input image has a uniform pixel value in every other line of the even and odd fields and whether consecutive lines of the even and odd fields have a blind pattern having a difference from the uniform pixel that is greater than or equal to a threshold value, and a determiner to determine whether the detected pattern that is similar to the judder pattern is a judder based on whether the blind pattern is detected.

49 Claims, 7 Drawing Sheets

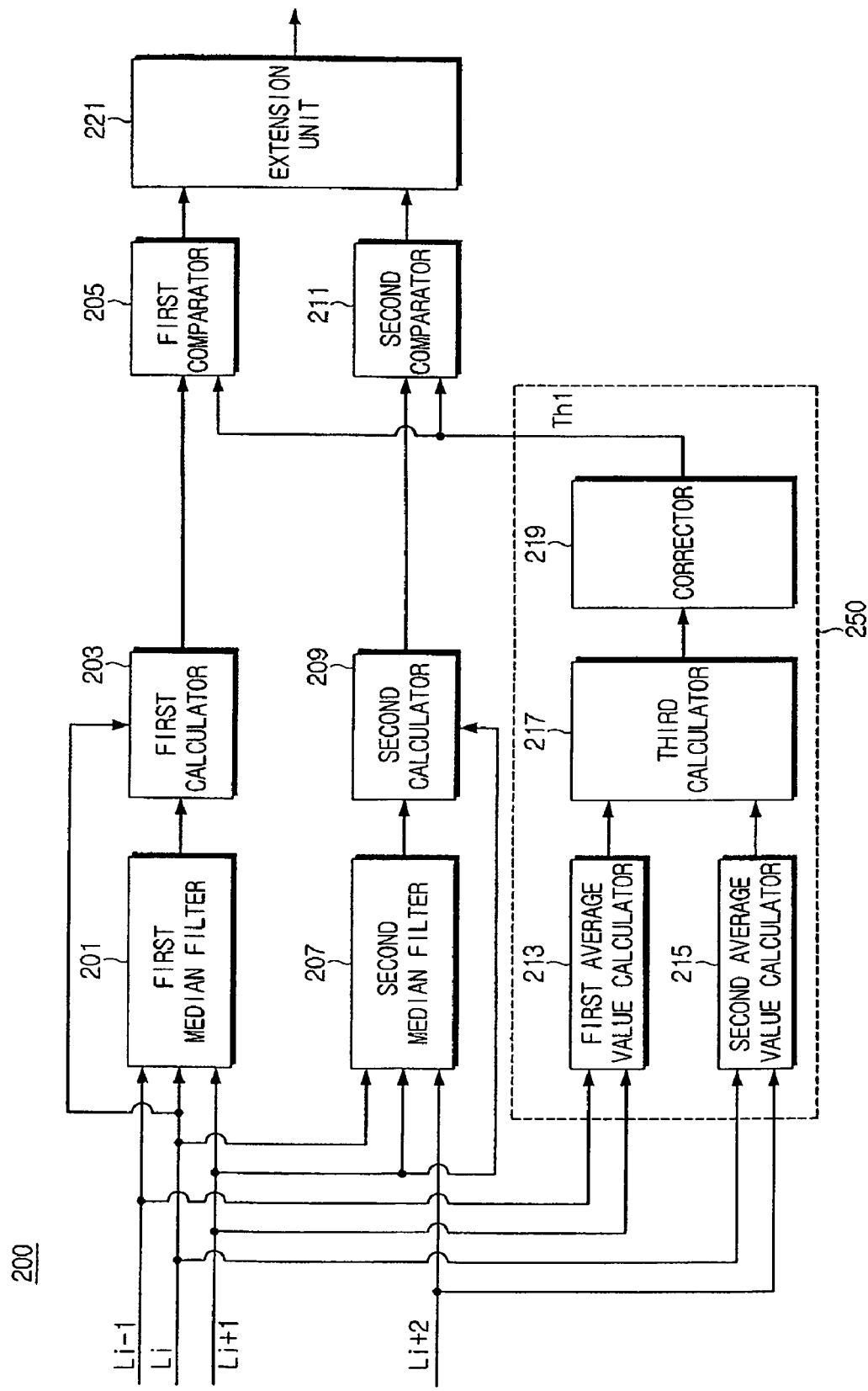

JUDDER DETECTION APPARATUS, DE-INTERLACING APPARATUS USING THE SAME, AND DE-INTERLACING METHOD

CROSS-REFERENCE TO RELATED APPLICATIONS

This application claims the benefit of Korean Patent Application No. 2004-113796 filed on Dec. 28, 2004 in the Korean Intellectual Property Office, the disclosure of which is incorporated herein by reference in its entirety.

BACKGROUND OF THE INVENTION

1. Field of the Invention

The present general inventive concept relates to a judder detection apparatus, a de-interlacing apparatus using the judder detection apparatus, and a de-interlacing method, and more particularly, to a judder detection apparatus to detect whether an input image includes a blind pattern and to determine that a judder does not occur in the input image if the input image includes the blind pattern, and a de-interlacing apparatus using the judder detection apparatus, and a de-interlacing method.

2. Description of the Related Art

A blind pattern included in an output image indicates that every other line of an input image has a uniform pixel value and that pixel values of consecutive lines are different.

With the development of recent digital TV technology and large-scale screen display devices, such as plasma digital panel (PDP) TVs, projection TVs using digital lighting processing (DLP), liquid crystal displays (LCDs), and liquid crystal on silicon (LCoS), or the like, a high definition (HD) image can be enjoyed. As such, digital image devices have become popular, and an environment in which analog image devices such as TVs and digital image devices coexist, has been generalized.

Thus, existing analog TV images in the United States National Television Systems Committee (NTSC) screens or Standard Definition (SD) screens must be processed. In general, the existing analog TV images use interlaced scanning and may be applied to a HD screen by improving a resolution or a scanning rate. A conversion of the interlaced scanning image into de-interlaced scanning image is effective to improve the resolution or the scanning rate.

Image lines which do not exist in the interlaced scanning image are generated, converted into the de-interlaced scanning image, and displayed. This process is generally referred to as de-interlacing.

Here, the interlaced scanning and the de-interlaced scanning are classified according frame constitution methods. In the interlaced scanning, two fields are embodied and interposed line by line so as to constitute one frame. In other words, only odd lines of odd fields and even lines of even fields are scanned to embody the one frame using the two fields.

The de-interlaced scanning is also called a progressive method in which an image signal is scanned line by line to constitute one frame and a screen flickers less than in the interlaced scanning.

In the de-interlaced scanning, motion information or format transformation information of an image is used to switch a spatial interpolation for performing an interpolation using information within a field, and a temporal interpolation for performing an interpolation using information of consecutively input fields.

In general, an image in a film mode is generated through a combination of two consecutive fields, or a temporal interpolation is used in a still area. However, when the temporal interpolation is used according to wrong film information (i.e., an output image is generated through a combination of two sequentially input fields even though an input image is not in the film mode), or when two sequentially input fields are combined in a motion area of the input image to generate an output image, a judder occurs around the motion area.

Here, the judder is averagely displayed in a straight line on a screen. However, the judder indicates that a line of an image is microscopically displayed in a zigzag form. When judder is detected from the input image due to motion in the input image, it may be determined that the input image is in the film mode such that the consecutively input fields should be combined to generate the output image. In this case, a quality of the input image deteriorates. In other words, when the judder is detected from the input image, and the consecutively input fields are combined to generate the output image, the quality of the image may deteriorate.

Also, when the input image has a similar pattern to a judder pattern due to noise, a blind pattern, or the like, the input image is falsely detected as having the judder. Thus, the consecutively input fields are not combined to generate the output image. Moreover, even when the output image is generated using the temporal interpolation, the quality of the input image may deteriorate.

SUMMARY OF THE INVENTION

Accordingly, the present general inventive concept provides a judder detection apparatus to prevent a judder detection error caused by a blind pattern of an input image, a de-interlacing apparatus using the judder detection apparatus, and a de-interlacing method.

Additional aspects and advantages of the present general inventive concept will be set forth in part in the description which follows and, in part, will be obvious from the description, or may be learned by practice of the general inventive concept.

The foregoing and/or other aspects of the present general inventive concept are achieved by providing a judder detection apparatus including a judder detector to detect a pattern and to determine whether the detected pattern is similar to a judder pattern using predetermined pixel values of even and odd fields sequentially input, a pattern detector to detect whether an input image has a uniform pixel value in every other line of the even and odd fields and whether consecutive lines of the even and odd fields have a blind pattern having a difference from the uniform pixel value that is greater than or equal to a threshold value, and a determiner to determine whether the detected pattern that is similar to the judder pattern is a judder based on whether the blind pattern is detected.

The judder detector may include a first median filter to select predetermined pixels from consecutive lines of the even and odd fields and to calculate a median value of the predetermined pixels, a first calculator to calculate an absolute difference value between a pixel value of the predetermined pixels of a median line of the consecutive lines and the calculated median value, and a first comparator to compare the calculated absolute difference value with a first threshold value and if the calculated absolute difference value is greater than the first threshold value, the first comparator determines that the detected pattern is similar to the judder pattern.

If the calculated absolute difference value is greater than the first threshold value, the first comparator may determine that a judder occurs in a pixel of the median line of the consecutive of the odd and the even fields.

The judder detector may further include a first setter to calculate the first threshold value using the selected predetermined pixels.

The first setter may include a first average value calculator to calculate an average value of pixels of the even field, a second average value calculator to calculate an average value of pixels of the odd field, and a third calculator to calculate an absolute difference value between the average values calculated by the first and second average value calculators and to set the calculated absolute difference value as the first threshold value.

The first setter may further include a corrector to compare the calculated absolute difference value with a preset predetermined value to correct the first threshold value.

The judder detector may further include an extension unit to determine that a judder occurs in a predetermined area around a pixel in which the judder is detected if it is determined that the detected pattern is similar to the judder pattern.

The selected predetermined pixels may be pixels positioned in a direction that form a predetermined angle with horizontal lines of the even and odd fields.

The judder detection apparatus may further include an analyzer to compare the detected pattern with a preset noise pattern to determine whether the detected pattern that is similar to the judder pattern occurs due to noise if the detected pattern is similar to the judder pattern.

The pattern detector may include a first line determiner to detect whether pixels of a predetermined line of the even field has uniform pixel values, a second line determiner to detect whether pixels of a predetermined line of the odd field have uniform pixel values, a first counter to count a number of pixels detected by the first line determiner, a second counter to count a number of pixels detected by the second line determiner, a third comparator to compare the number of pixels counted by the first counter with a second threshold value to determine whether the predetermined line of the even field has a uniform pixel value, a fourth comparator to compare the number of pixels counted by the second counter with a third threshold value to determine whether the predetermined line of the odd field has a uniform pixel value, and a selector to determine that the even and odd fields have blind patterns if it is determined that the predetermined lines of the even and odd fields have the uniform pixel values.

The first line determiner may include a first delayer to delay a predetermined pixel of the predetermined line to output a first delayed pixel, a second delayer to delay the first delayed pixel to output a second delayed pixel, a fifth calculator to calculate an absolute difference value between a pixel value of the predetermined pixel and a pixel value of the first delayed pixel, a sixth calculator to calculate an absolute difference value between the pixel value of the first delayed pixel and a pixel value of the second delayed pixel, a seventh calculator to calculate an absolute difference value between the pixel value of the second delayed pixel and the pixel value of the predetermined pixel, a sixth comparator comparing the absolute difference value calculated by the fifth calculator with a fifth threshold value to determine whether the predetermined pixel and the first delayed pixel have the uniform pixel values, a seventh comparator to compare the absolute difference value calculated by the sixth calculator with a sixth threshold value to determine whether the first and second delayed pixels have uniform pixel values, and an eighth comparator to compare the absolute value calculated by the seventh calculator with a seventh threshold value to determine whether the predetermined pixel and the second delayed pixel have uniform pixel values.

The pattern detector may further include a second setter to compare an absolute difference value between pixel values of the even and odd fields with a fourth threshold value using consecutive lines of the even and odd fields to determine whether the pixel values between the consecutive lines of the even and odd fields are different from each other to determine whether to generate a blind determination signal.

The second setter may include a third average value calculator to calculate an average value of pixels positioned in lines of the even field, a fourth average value calculator to calculate an average value of pixels positioned in lines of the odd field, a fourth calculator to calculated an absolute difference value between the average values calculated by the third and fourth average value calculators, and a fifth comparator to compare the calculated absolute difference value with the fourth threshold value, and if the calculated absolute difference value is greater than or equal to the fourth threshold value, the fifth comparator determines that the pixel values of the consecutive lines of the even and odd fields are different from each other and generates the blind determination signal.

The judder detection apparatus may further include a selector to determine whether the even and odd fields have the blind pattern depending on the blind determination signal generated by the fifth comparator that determines that the pixel values of the consecutive lines of the even and odd fields are different from each other.

The foregoing and/or other aspects of the present general inventive concept are also achieved by providing a judder detection apparatus, comprising a judder detector to detect pixel patterns of an image and to determine whether the detected pixel patterns match a judder pattern, and a pattern detector/analyzer to determine whether the detected pixel patterns match one or more predetermined judder-like noise patterns when the detected pixel patterns are determined to match the judder pattern, to output a judder detection signal when the detected pixel patterns match the judder pattern and do not match the one or more judder-like noise patterns, and to output a non-judder detection signal when the detected pixel patterns do not match the judder pattern or when the detected pixel patterns match both the judder pattern and the one or more predetermined judder-like noise patterns.

The foregoing and/or other aspects of the present general inventive concept are also achieved by providing a de-interlacing apparatus including a judder detector to detect a pattern and to determine whether the detected pattern is similar to a judder pattern using predetermined pixel values of even and odd fields sequentially input, a pattern detector to detect whether an input image has a uniform pixel value in every other line of the even and odd fields and whether consecutive lines of the even and odd fields have a blind pattern having a difference value from the uniform pixel value that is greater than or equal to a threshold value, a determiner to determine whether the detected pattern that is similar to the judder pattern is actual judder based on whether the blind pattern is detected, and an interpolator to interpolate the even and odd fields according to the determination of the determiner.

If the determiner determines that a judder occurs in the input image, the interpolator may interpolate a field in which the judder occurs using a spatial interpolation using information within the field.

If the determiner determines that the judder does not occur in the input image, the interpolator may generate an output image using information of the even and odd fields.

The de-interlacing apparatus may further include a field memory to store a plurality of fields of the input image.

The foregoing and/or other aspects of the present general inventive concept are also achieved by providing a de-interlacing apparatus, comprising a judder detection apparatus to detect pixel patterns of an image, to determine whether the detected pixel patterns match a judder pattern, to determine whether the detected pixel patterns match one or more predetermined judder-like noise patterns when the detected pixel patterns are determined to match the judder pattern, to output a judder detection signal when the detected pixel patterns match the judder pattern and do not match the one or more predetermined judder-like noise patterns, and to output a non-judder detection signal when the detected pixel patterns do not match the judder pattern or when the detected pixel patterns match both the judder pattern and the one or more predetermined judder-like noise patterns.

The foregoing and/or other aspects of the present general inventive concept are also achieved by providing a de-interlacing apparatus, comprising a judder detector to receive an image signal having a plurality of pixels and to detect a judder pattern, a pattern determiner to determine whether the detected judder pattern is a result of at least one of noise and a blind pattern, and an interpolator to interpolate the image using a temporal interpolation when the detected judder pattern is determined to be a result of the at least one of noise and the blind pattern, and to interpolate the image using a spatial interpolation when the detected judder pattern is determined not to be the result of the at least one noise and the blind pattern.

The foregoing and/or other aspects of the present general inventive concept are also achieved by providing a de-interlacing method including detecting a pattern and determining whether the detected pattern is similar to a judder pattern using predetermined pixel values of even and odd fields sequentially input, detecting whether an input image has a uniform pixel value in every other line of the even and odd fields and detecting whether consecutive lines have a blind pattern by determining a difference value of the uniform pixel value is greater than or equal to a threshold value, determining whether the detected pattern that is similar to the judder pattern is actual judder based on whether the blind pattern is detected, and interpolating the even and odd fields according to the determination of whether the detected patter is the actual judder.

The detecting of the pattern and the determining of whether the detected pattern is similar to the judder pattern using the predetermined pixel values of the even and odd fields sequentially input may include selecting predetermined pixels from consecutive lines of the even and odd fields and calculating a median value of the selected predetermined pixels, calculating an absolute difference value between a pixel value of a pixel of a median line of the consecutive lines and the calculated median value, and comparing the absolute difference value with a first threshold value, and if the calculated absolute difference value is greater than the first threshold value, determining that the detected pattern is similar to the judder pattern.

If the calculated absolute difference value is greater than the first threshold value, it may be determined that a judder occurs in a pixel of the median line of the consecutive lines.

The determining of whether the detected pattern is similar to the judder pattern using the predetermined pixel values of the even and odd fields sequentially input may further include calculating the first threshold value using the selected predetermined pixels.

The calculating of the first threshold value may include calculating an average value of the predetermined pixels selected from of the even field and calculating an average value of the predetermined pixels selected from the odd field, and calculating an absolute difference value between the average values of the predetermined pixels of the even and odd fields and to set the calculated absolute difference value as the first threshold value.

The calculating of the first threshold value may further include comparing the calculated absolute difference value with a preset predetermined value to correct the first threshold value.

The determining of whether the detected pattern is similar to the judder pattern using the predetermined pixel values of the even and odd fields sequentially input may further include if it is determined that the detected pattern is similar to the judder pattern, determining that a judder occurs in a predetermined area around a pixel in which the judder is detected.

The selected predetermined pixels may be pixels positioned in a direction that form a predetermined angle with horizontal lines of the even and odd fields.

The de-interlacing method may further include if the detected pattern is similar to the judder pattern, comparing the detected pattern that is similar to the judder pattern with a preset noise pattern to determine whether the detected pattern occurs due to noise.

The detecting of whether the input image has the uniform pixel value in every other line of the even and odd fields and whether the consecutive lines have the blind pattern by determining the difference of the uniform pixel value that is greater than or equal to the threshold value may include detecting whether pixels of predetermine lines of the even and odd fields have uniform pixel values, counting numbers of the pixels detected in the predetermined lines of the even and odd fields that have the uniform pixel values, comparing the number of the pixels counted in the predetermined line of the even field with a second threshold value and the number of the pixels counted in the predetermined line of the odd field with a third threshold value, and if it is determined that the numbers of pixels in the predetermined lines of the even and odd fields having uniform pixel values that are greater than the second and third threshold values, respectively, determining that the even and odd fields have blind patterns.

The detecting of whether the pixels of the predetermined lines of the even and odd fields have uniform pixel values may include delaying a predetermined pixel of the predetermined line to output a first delayed pixel and delaying the first delayed pixel to output a second delayed pixel; calculating a first absolute difference value between pixel values of the predetermined pixel and the first delayed pixel, calculating a second absolute difference value between pixel values of the first and second delayed pixels, and calculating a third absolute difference value between pixel values of the second delayed pixel and the predetermined pixel, and comparing the first, second, and third absolute difference values with a threshold value and to determine whether the predetermined pixel and the first delayed pixel have uniform pixel values, whether the first and second delayed pixels have uniform pixel values, and whether the predetermined pixel and the second delayed pixel have uniform pixel values.

The detecting of whether the input image has the uniform pixel value in every other line of the even and odd fields and whether the consecutive lines have the blind pattern by determining whether the difference from the uniform pixel value that is greater than or equal to the threshold value may further include comparing a difference value between pixel values of the even and odd fields with a fourth threshold value using consecutive lines of the even and odd fields to determine whether pixel values of the consecutive lines are different to determine whether to generate a blind determination signal.

The determining of whether the pixel values of the consecutive lines are different may include calculating an average value of pixel values of lines of the even field and an average value of pixel values of lines of the odd field, calculating an absolute difference value between the average values of the pixel values of the lines of the even and odd fields, and comparing the calculated absolute difference value with the fourth threshold value, and if the calculated absolute difference value is greater than or equal to the fourth threshold value, determining that the pixel values of the consecutive lines are different and generating the blind determination signal accordingly.

A selection may be made as to whether the even and odd fields have the blind patterns according to the blind determination signal generated by the determination that the pixel values of the consecutive lines are different.

If it is determined that the judder occurs in the input image, a spatial interpolation may be performed with respect to a field in which the judder occurs using information within the field.

If it is determined that the judder does not occur in the input image, an output image may be generated using information of the even and odd fields.

The foregoing and/or other aspects of the present general inventive concept are also achieved by providing a de-interlacing method, the method comprising receiving an image signal having a plurality of pixels, detecting a judder pattern, determining whether the detected judder pattern is a result of at least one of noise and a blind pattern, and interpolating the image using a temporal interpolation when the detected judder pattern is determined to be a result of the at least one of noise and the blind pattern, and interpolating the image using a spatial interpolation when the detected judder pattern is determined not to be the result of the at least one noise and the blind pattern.

The foregoing and/or other aspects of the present general inventive concept are also achieved by providing a de-interlacing method, the method comprising detecting pixel patterns of an image, determining whether the detected pixel patterns match a judder pattern, determining whether the detected pixel patterns match one or more predetermined judder-like noise patterns when the detected pixel patterns are determined to match the judder pattern, and outputting a judder detection signal when the detected pixel patterns match the judder pattern and do not match the one or more predetermined judder-like noise patterns, and outputting a non-judder detection signal when the detected pixel patterns do not match the judder pattern or when the detected pixel patterns match both the judder pattern and the one or more predetermined judder-like noise patterns.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 3A is a block diagram illustrating a judder detector of the judder detection apparatus of FIG. 1 according to another embodiment of the present general inventive concept;

DETAILED DESCRIPTION OF THE PREFERRED EMBODIMENTS

Figure 1:
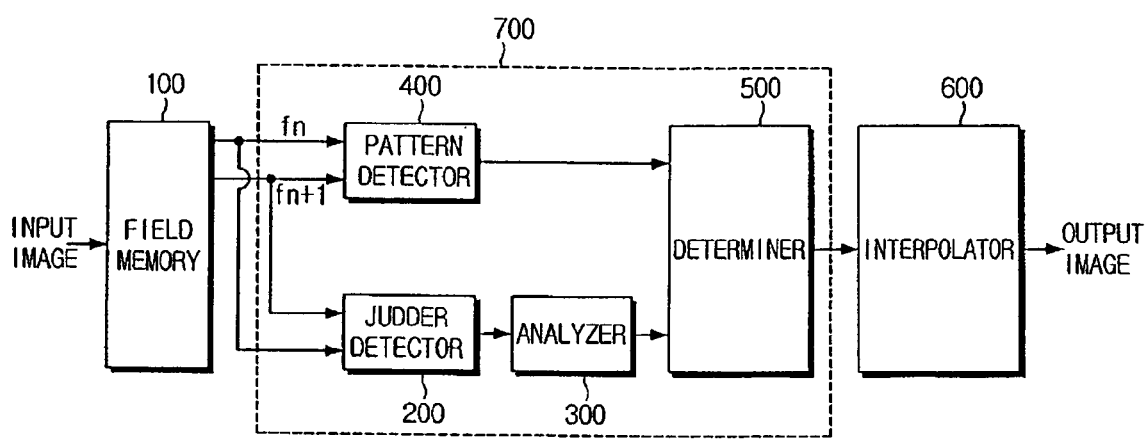
FIG. 1 is a block diagram illustrating a de-interlacing apparatus including a judder detection apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a de-interlacing apparatus including a judder detection apparatus 700 according to an embodiment of the present general inventive concept. Referring to FIG. 1, the judder detection apparatus 700 includes a judder detector 200, an analyzer 300, a pattern detector 400, and a determiner 500. The de-interlacing apparatus further includes a field memory 100 and an interpolator 600 in addition to the judder detection apparatus 700.

The judder detector 200 of the judder detection apparatus 700 detects whether two sequentially input fields (i.e., an even field and an odd field) include pixels having patterns that are similar to a judder pattern. Here, the judder detector 200 detects whether pixels of consecutive lines of the even and odd fields have the patterns that are similar to the judder pattern. In other words, the judder detector 200 determined whether detected patterns match the judder pattern(s).

The analyzer 300 determines whether noise generates pixels having the patterns that are similar to the judder pattern detected by the judder detector 200. In other words, the analyzer 300 stores noise patterns (i.e., the detected patterns) to compare the patterns that are similar to the judder pattern with the stored noise patterns. The noise patterns may be pre-stored before operation of the judder detection apparatus 700.

The pattern detector 400 detects whether the even and odd fields include blind patterns. If a predetermined line of the even field has a uniform pixel value, a predetermined line of the odd field has a uniform pixel value, and a difference between the uniform pixel values of the even and odd fields is greater than or equal to a predetermined value, the pattern detector 400 determines that the even and odd fields include the blind patterns. Here, the blind patterns indicate that every other line of the input image has the uniform pixel value but that consecutive lines have non-uniform pixel values, and thus an output image has a blind pattern.

The determiner 500 determines whether a judder occurs in each pixel of the input image, using the results of the pattern detector 400 and the analyzer 300. If the blind pattern is detected from the input image, the determiner 500 determines that the input image does not have a pattern that is similar to the judder pattern.

The field memory 100 stores a plurality of fields of the input image.

The interpolator 600 interpolates the input image according to a result of a film mode determiner (not shown). In other words, if the film mode determiner determines that the input image is in a film mode, the interpolator 600 performs an interpolation (i.e., a temporal interpolation) using the even and odd fields sequentially input. In other words, the interpolator 600 combines the even and odd fields to generate the output image.

However, if the film mode determiner determines that the input image is not in the film mode, the interpolator 600 performs the interpolation using a spatial interpolation method of performing an interpolation using field information within a field to be interpolated, so as to prevent a judder from occurring due to the generation of the output image through a combination of two consecutive fields.

Figure 2:
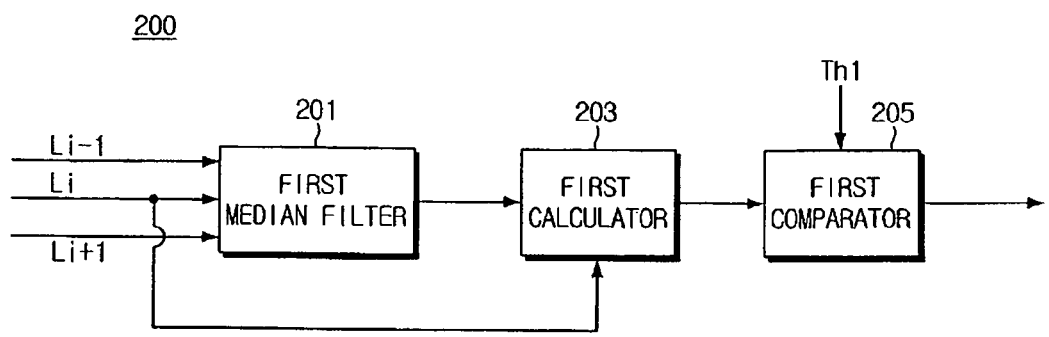
FIG. 2 is a block diagram illustrating a judder detector of the judder detection apparatus of FIG. 1 according to an embodiment of the present general inventive concept.

FIG. 2 is a block diagram illustrating the judder detector 200 of the judder detection apparatus 700 of FIG. 1. Referring to FIG. 2, the judder detector 200 includes a first median filter 201, a first calculator 203, and a first comparator 205.

The first median filter 201 selects three pixels from three consecutive lines, respectively, of the even and odd fields sequentially input from the field memory 100 and calculates a median value of the three selected pixels. In other words, the three consecutive lines may be a first even field line, a first odd field line, and a second even field line, or may be the first odd field line, the first even field line, and a second odd field line.

Here, the three selected pixels may be pixels in the same position along the three consecutive lines. Alternatively, the three pixels may be sequentially selected starting from a first line of the three consecutive lines so that their respective position values are increased or decreased.

The three pixels may be selected in a direction along which the judder is highly likely to occur. In other words, pixels positioned in a direction that forms a predetermined angle with a horizontal line may be selected. Additionally, a number of selected pixels may be arbitrary, and a selection of an odd number of pixels may make a detection and calculation of the judder simple and more reliable.

The first calculator 203 calculates an absolute difference value between the median value of the three selected pixels input from the first median filter 201 and a pixel value of a second line (i.e., a second pixel). In other words, the first calculator 203 calculates the absolute difference value between a pixel value of the first odd field line or the first even field line that is the second line of the three consecutive lines and the median value. If the absolute difference between the median value of the three selected pixels and the pixel value of the second line is small, it may be determined that values of the three selected pixels are similar to each other. In this case, it may be determined that the second pixel of the second line does not have a pattern that is similar to the judder pattern, and the judder does not occur in the second pixel.

The first comparator 205 compares the absolute difference value between the median value and the pixel value of the second pixel input from the first calculator 203 with a first threshold value Th1. If the absolute difference value is greater than the first threshold value Th1, the first comparator 205 may determine that a pattern that is similar to the judder pattern occurs at the second pixel. If the absolute difference value is less than the first threshold value Th1, the first comparator 205 may determine that the pattern that is similar to the judder pattern does not occur at the second pixel. Additionally, if the first threshold value Th1 is less than the absolute difference value, the first comparator 205 generates a judder occurrence determination signal and outputs the judder occurrence determination signal to the analyzer 300.

FIG. 3A is a block diagram illustrating the judder detector 200 of the judder detection apparatus 700 of FIG. 1 according to another embodiment of the present general inventive concept. The judder detector 200 of FIG. 2 detects whether the judder occurs according to the first threshold value Th1, which may be preset using the three consecutive lines of the even and odd fields. However, the judder detector 200 of FIG. 3A uses a plurality of lines that is more than three. Additionally, the judder detector 200 of FIG. 3A detects whether a judder occurs, using the first threshold value Th1 that is calculated using pixel values of the plurality of lines.

Referring to FIG. 3A, the judder detector 200 according to the present embodiment includes the first median filter 201 to detect whether a judder occurs using first, second, and third lines $L_{i-1}$, $L_i$, and $L_{i+1}$, the first calculator 203, and the first comparator 205. The judder detector 200 further includes a second median filter 207 to detect whether a judder occurs using second, third, and fourth lines $L_i$, $L_{i+1}$, and $L_{i+2}$, a second calculator 209, and a second comparator 211.

Here, the first median filter 201, the first calculator 203, and the first comparator 205 are as described above with reference to FIG. 2. The second median filter 207, the second calculator 209, and the second comparator 211 perform the same operations as the first median filter 201, the first calculator 203, and the first comparator 205, respectively, except that they use different lines to detect whether the judder occurs.

The judder detector 200 includes a first setter 250 to calculate the first threshold value Th1 used in the first and second comparators 205 and 211. Here, the first setter 250 includes a first average value calculator 213, a second average value calculator 215, a third calculator 217, and a corrector 219.

The first average value calculator 213 calculates a first average value of pixel values selected from two lines selected from the same field of four lines input to the first and second median filters 201 and 207 (i.e., one of the even and odd fields). The second average value calculator 215 calculates a second average value of pixel values selected from two lines of the other field (i.e., the other one of the even and odd fields) of the four lines except for the two lines selected by the first average value calculator 213.

The third calculator 217 calculates an absolute difference value between the first and second average values calculated by the first and second average value calculators 213 and 215, respectively, to determine the first threshold value Th1. In other words, the third calculator 217 calculates a difference between an average value of pixel values selected from two consecutive lines of the even field and an average value of pixel values selected from two consecutive lines of the odd field. The difference in the first and second average values indicates when the first and second comparators 205 and 211 output a comparison with outputs of the first and second calculators 203 and 209 is not enough determine that the judder occurs in the input image. Thus, the absolute difference value between the first and second average values may be determined as the first threshold value Th1.

If the first threshold value Th1 calculated by the third calculator 217 is determined as a value that is sufficient to cause an error in the detection of the judder, the corrector 219 corrects the first threshold value Th1. The first threshold value Th1 corrected by the corrector 219 is output to the first and second comparators 205 and 211 to be used in the detection of the judder.

A judder is also highly likely to occur in an area around where the judder is determined to occur. Thus, when the first and second comparators 205 and 211 detect the judder, an extension unit 221 determines the area around the area in which the judder is determined to occur as a judder occurrence area.

Figure 3B:
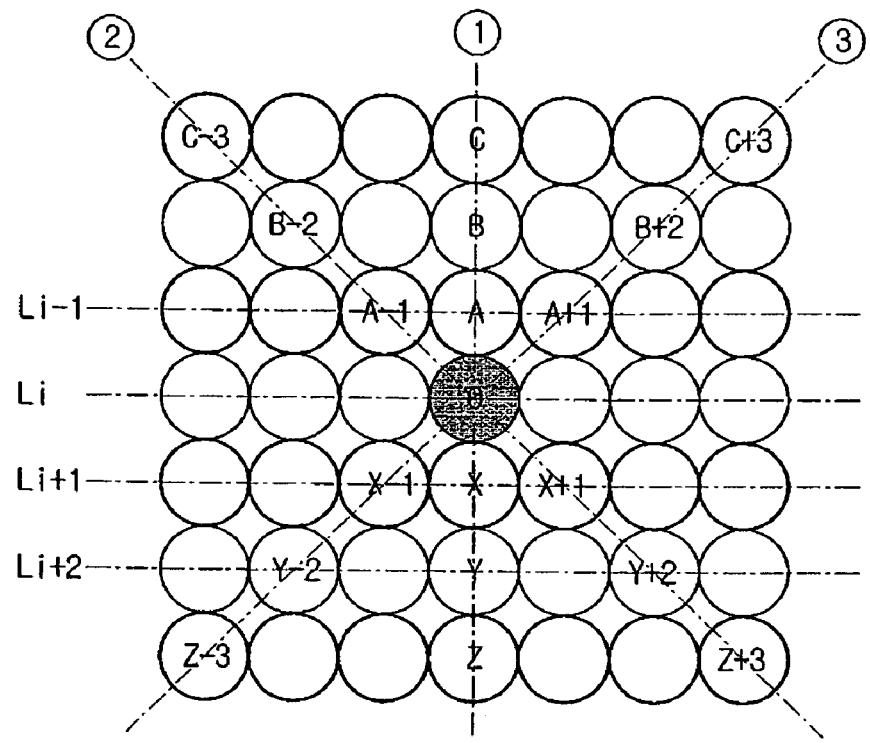
FIGS. 3B and 3C are views illustrating an operation of the judder detector of FIG. 3A.
Figure 3C:
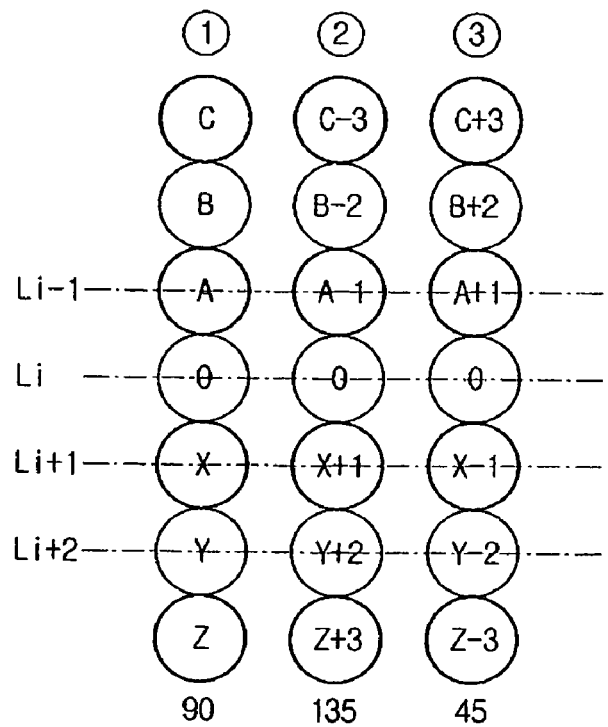
Figure 4A:
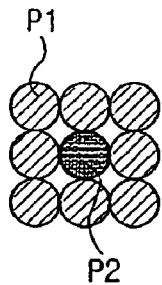
FIGS. 4A through 4E are views illustrating an operation of an analyzer of the judder detection apparatus of FIG. 1 according to an embodiment of the present general inventive concept.
Figure 4B:
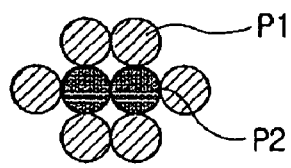
Figure 4C:
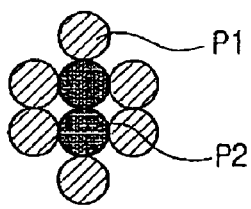
Figure 4D:
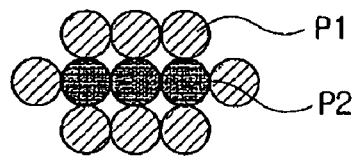
Figure 4E:
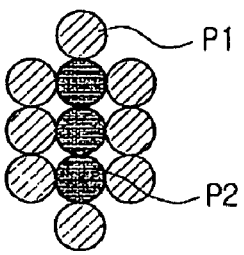

FIGS. 3B and 3C are views illustrating operation of the judder detector 200 of FIG. 3A. FIG. 3B is a view illustrating pixels of lines used in the first and second median filters 201 and 207, and FIG. 3C is a view illustrating a vertical column arrangement of the pixels along the lines of FIG. 3B. The operation of the judder detector 200 is described below with reference to FIGS. 1, 2, 3A, 3B, 3C, and 4A through 4E.

Here, ① represents a direction perpendicular to line $L_i$, ② represents a 135° direction counterclockwise with respect to the line $L_i$, and ③ represents a 45° direction counterclockwise with respect to the line $L_i$. Also, $L_{i-1}$ and $L_{i+1}$ represent lines of the same field, and $L_i$ and $L_{i+2}$ represent lines of the same field. For example, if $L_{i-1}$ and $L_{i+1}$ may be consecutive lines of the even field, $L_i$ and $L_{i+2}$ may be consecutive lines of the odd field.

Referring to FIG. 3B, the first median filter 201 may calculate the median value (i.e., a first median value) using various pixels depending on directions of the three pixels selected from first, second, and third lines $L_{i-1}$, $L_i$, and $L_{i+1}$. If the three pixels are selected along the direction perpendicular to the line $L_i$, the median value is calculated using pixels A, O, and X. If the three pixels are selected along the 1350 direction counterclockwise with respect to the line $L_i$, the median value is calculated using pixels A−1, O, and X+1. If the three pixels are selected along the 45° direction counterclockwise with respect to the line $L_i$, the median value is calculated using pixels A+1, O, and X−1.

In general, the direction perpendicular to the line $L_i$ is a direction in which judder is likely to occur. Thus, an operation of detecting a judder using the pixels A, O, and X will now be described.

The first median filter 201 calculates a median value of values of the pixels A, O, and X as the median value, and the first calculator 203 calculates an absolute difference value between the median value and a value of the pixel O that is substantially a central pixel. The first comparator 205 compares the absolute difference value with the first threshold value Th1. If the absolute difference value is greater than the first threshold value Th1, the comparator 205 determines that a judder occurs and outputs a judder occurrence determination signal.

Here, the first threshold value Th1 may be preset by a user as described with reference to FIG. 2. Alternatively, the first threshold value Th1 may be calculated using pixel values of lines input from the first setter 250, and may then be output to the first and second comparators 205 and 211 as described with reference to FIG. 3A.

The second median filter 207 may use various pixels to calculate a second median value depending on directions of three pixels selected from second, third, and fourth lines $L_i$, $L_{i+1}$, and $L_{i+2}$ as in the first median filter 201. If the three pixels are selected in the direction perpendicular to the line $L_i$, the second median value is calculated using pixels O, X, and Y. If the three pixels are selected in the 135° direction counterclockwise with respect to the line $L_i$, the second median value is calculated using pixels O, X+1, and Y+2. If the three pixels are selected in the 45° direction counterclockwise with respect to the line $L_i$, the second median value is calculated using pixels O, X−1, and Y−2.

Here, the pixels used by the first and second median filters 201 and 207 to calculate the first and second median values are in the direction perpendicular to the line $L_i$ and the 45° and 135° directions counterclockwise with respect to the line $L_i$. However, the judder may occur in other directions such as a direction horizontal to the line $L_i$ and/or other angle directions. Thus, the first and second median filters 201 and 207 can use pixels arranged on other lines to calculate the first and second median values, respectively.

Referring to FIG. 3C, if the pixels used to calculate the median value (e.g., the first or second median value) are selected in directions ①, ②, and ③, the pixels are arranged in a vertical direction.

FIGS. 4A through 4E are views illustrating an operation of the analyzer 300 of the judder detection apparatus 700 of FIG. 1. FIGS. 4A through 4E illustrate some examples of patterns of pixels that are generated by noise and are similar to a judder pattern(s). The noise patterns that are similar to a judder pattern may be preset by the analyzer 300. Here, P1 represents pixels that are not determined as judder patterns by the judder detector 200, and P2 represents pixels that are determined as judder patterns by the judder detector 200. The analyzer 300 compares patterns in the input image with the noise patterns.

Referring to FIGS. 4A through 4E, the analyzer 300 compares a preset noise pattern with a detected judder pattern to analyze whether judder actually occurs when the judder occurrence determination signal is received from the judder detector 200. The analyzer 300 may include a plurality of preset noise patterns. In particular, if the judder occurrence determination signal is received from the judder detector 200 by the analyzer 300, a pattern that is similar to the judder pattern detected by the judder detector 200 is compared with the preset noise pattern. In other words, a determination is made as to whether the pattern that is similar to the judder pattern detected by the judder detector 200 corresponds with the preset noise patterns illustrated in FIGS. 4A through 4E.

If the pattern that is similar to the judder pattern detected (in the input image) by the judder detector 200 corresponds with the preset noise pattern, the analyzer 300 determines that the pattern that is similar to the judder pattern is generated in the input image by noise. Thus, the analyzer 300 determines that judder does not occur as a result of motion in the input image. Thus, if the pattern that is similar to the judder pattern detected by the judder detector 200 corresponds with the preset noise pattern, the analyzer 300 outputs a signal indicating that the judder does not occur to the determiner 500.

Figure 5:
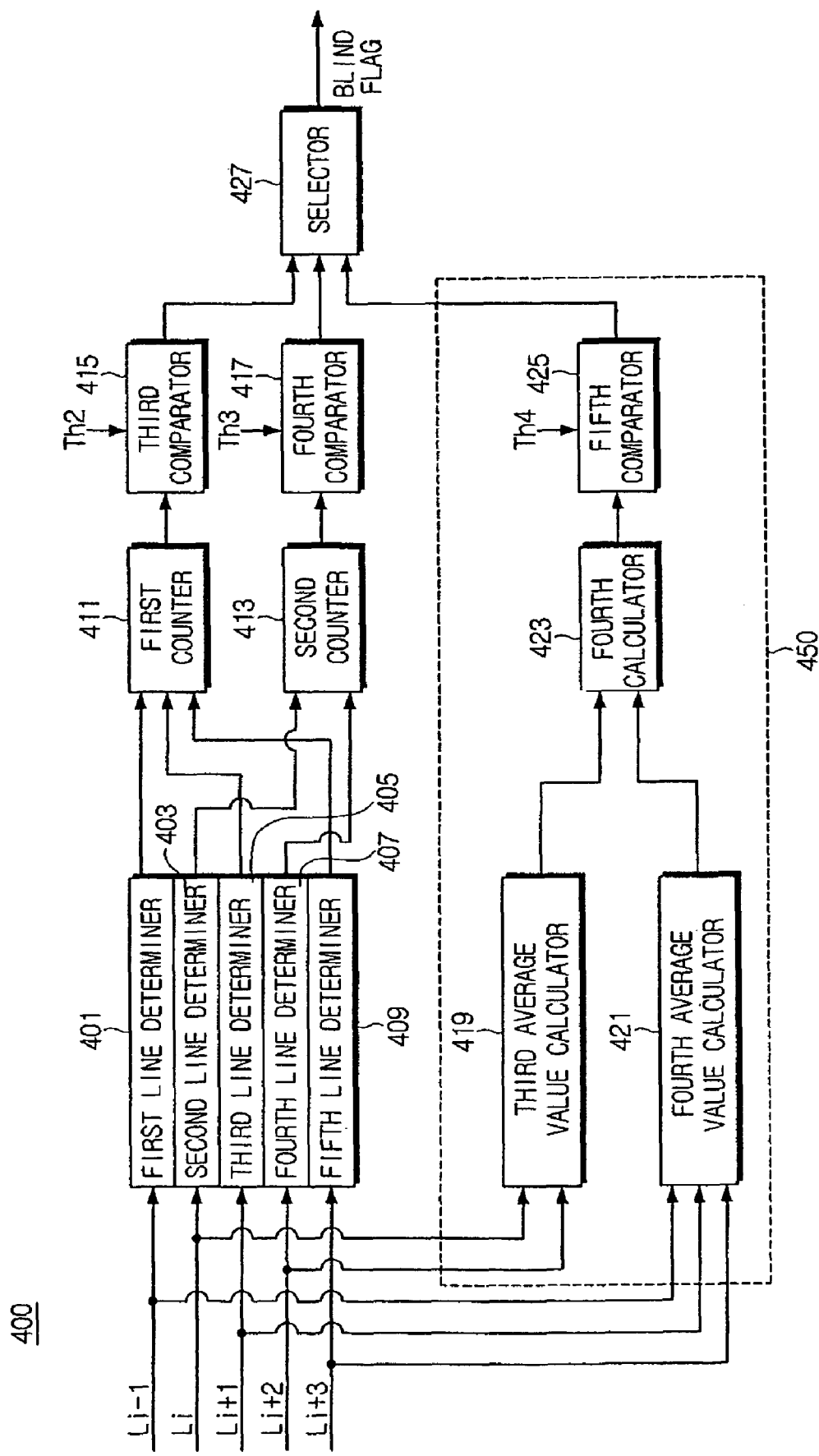
FIG. 5 is a block diagram illustrating a pattern detector of the judder detection apparatus of FIG. 1 according to an embodiment of the present general inventive concept.

FIG. 5 is a block diagram illustrating the pattern detector 400 of the judder detection apparatus 700 of FIG. 1. Referring to FIG. 5, the pattern detector 400 according to the present embodiment includes first, second, third, fourth, and fifth line determiners 401, 403, 405, 407, and 409, first and second counters 411 and 413, third and fourth comparators 415 and 417, a second setter 450, and a selector 427. Here, the second setter 450 includes a third average value calculator 419, a fourth average value calculator 421, a fourth calculator 423, and a fifth comparator 425.

The first, second, third, fourth, and fifth line determiners 401, 403, 405, 407, and 409 detect whether predetermined pixels have uniform pixel values in a predetermined number of consecutive lines of two sequential fields of an input image. In other words, the first, second, third, fourth, and fifth line determiners 401, 403, 405, 407, and 409 determine whether each of the consecutive lines (e.g., a first line, a second lines, etc.) includes uniform pixel values by comparing consecutive pixel values in each line.

The first and second counters 411 and 413 count whether pixel values of the same line of lines of the sequential fields (i.e., even and odd fields) are different from consecutive pixels using the results of the first, second, third, fourth, and fifth line determiners 401, 403, 405, 407, and 409.

The third and fourth comparators 415 and 417 respectively compare values counted by the first and second counters 411 and 413 with second and third threshold values. If the counted values are smaller than the second and third threshold values, respectively, the third and fourth comparators 415 and 417 determine that the same line has uniform pixel values.

The third and fourth average value calculators 419 and 421 respectively calculate an average value of pixel values selected from consecutive lines of the odd field and an average value of pixels selected from consecutive lines of the even field.

The fourth calculator 423 calculates an absolute difference value between the average values calculated by the third and fourth average value calculators 419 and 421. In other words, the fourth calculator 423 calculates an absolute difference value between an average value of pixel values of the odd field and an average value of pixel values of the even field.

The fifth comparator 425 compares the absolute difference value calculated by the fourth calculator 423 with a fourth threshold value Th4. If the absolute difference value is greater than the fourth threshold value Th4, it may be determined that lines of the input image used by the third and fourth average value calculators 419 and 421 have blind patterns.

If the input image has a blind pattern, a difference between a pixel value of a line of the odd field and a pixel value of a line of the even field is more than or equal to a predetermined value (i.e., the fourth threshold value). Thus, the fifth comparator 425 outputs a blind determination signal to determine that the input image has the blind pattern to the selector 427.

The selector 427 determines whether the input image has the blind pattern, using the results of the third, fourth, and fifth comparators 415, 417, and 425. In other words, if the third and fourth comparators 415 and 417 determine that the values counted by the first and second counters 411 and 413 are less than the second and third threshold values Th2 and Th3, the selector 427 determines according to the comparison result of the fifth comparator 425 that the input image has the blind pattern even when the difference between the pixel values of the lines of the even and odd fields is more than or equal to the fourth threshold value Th4.

The third and fourth comparators 415 and 417 determine that the counted values are less than the second and third threshold values. Thus, although pixels of the lines of the even and odd fields have uniform values, the selector 427 may determine that the input image has the blind pattern only when the pixel values of the lines of the odd field are different from the pixel values of the lines of the even field as indicated by the fifth comparator 425.

Figure 6:
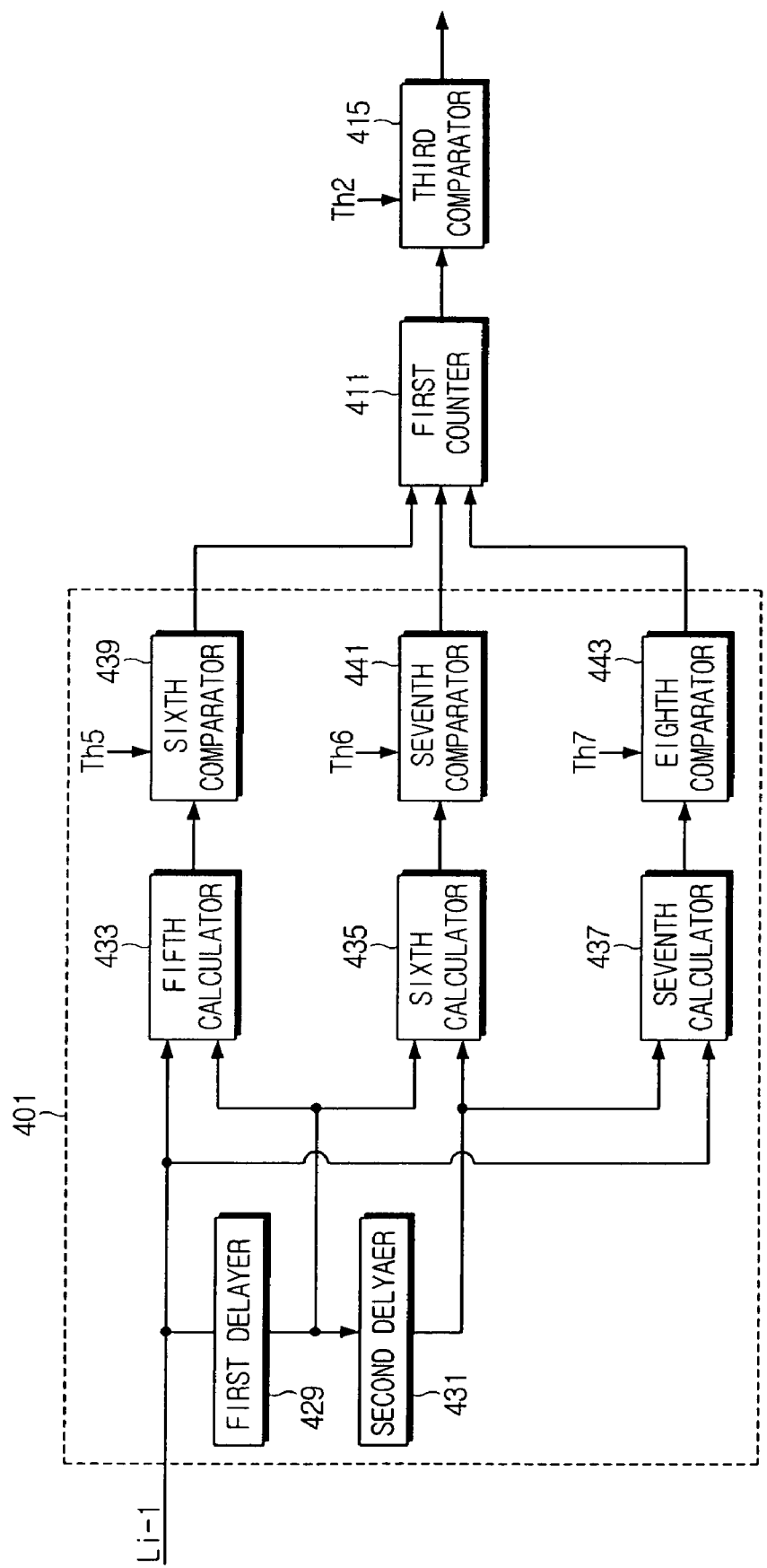
FIG. 6 is a block diagram illustrating a first line determiner of the pattern detector of FIG. 5 according to an embodiment of the present general inventive concept.

FIG. 6 is a block diagram illustrating the first line determiner 401 of the pattern detector 400 of FIG. 5. Referring to FIG. 6, the first line determiner 401 includes a first delayer 429, a second delayer 431, fifth, sixth, and seventh calculators 433, 435, and 437, and sixth, seventh, and eighth comparators 439, 441, and 443.

Since the first line determiner 401 determines whether the line $L_{i-1}$ has uniform pixel values, the first delayer 429 delays a predetermined pixel of the line $L_{i-1}$, and the second delayer 431 delays the predetermined pixel that has been delayed by the first delayer 429.

Hereinafter, the predetermined pixel of the line $L_{i-1}$ is referred to as S1, the predetermined pixel delayed by the first delayer 429 is referred to as S2, and the predetermined pixel delayed by the second delayer 431 is referred to as S3.

The fifth, sixth, and seventh calculators 433, 435, and 437 calculate a difference among values of three pixels of the line $L_{i-1}$. The fifth calculator 433 calculates an absolute difference value between pixel values of the predetermined pixels S1 and S2 of the line $L_{i-1}$, and the sixth calculator 435 calculates an absolute difference value between pixel values of the predetermined pixels S2 and S3. The seventh calculator 437 calculates an absolute difference value between the pixel values of the predetermined pixels S1 and S3.

The sixth, seventh, and eighth comparators 439, 441, and 443 compare the absolute difference values calculated by the fifth, sixth, and seventh calculators 433, 435, and 437 with a predetermined value. In other words, the sixth comparator 439 compares the absolute difference value calculated by the fifth calculator 433 with a fifth threshold value Th5, and the seventh comparator 441 compares the absolute difference value calculated by the sixth calculator 435 with a sixth threshold value Th6. The eighth comparator 443 compares the absolute difference value calculated by the seventh calculator 437 with a seventh threshold value Th7.

If the sixth, seventh, and eighth comparators 439, 441, and 443 determine that the absolute difference values are greater than the predetermined value (i.e., the fifth, sixth, and seventh threshold values Th5, Th6, and Th7), the sixth, seventh, and eighth comparators 439, 441, and 443 determine that the difference among the pixel values of the three pixels of the line $L_{i-1}$ are greater than or equal to the predetermined value, and thus the three pixels do not have the uniform pixel values.

The comparison results of the sixth, seventh, and eighth comparators 439, 441, and 443 are input to the first counter 411, and the value counted by the first counter 411 is input to the third comparator 415. The third comparator 415 compares the value counted by the first counter 411 with the second threshold value Th2. If the second threshold value Th2 is greater than the value counted by the counter 411, the third comparator 415 determines that the line $L_{i-1}$ has the uniform pixel values. In other words, the first counter 411 counts a number of comparisons in which the sixth, seventh, and eighth comparators 439, 441, and 443 does not indicate uniform pixel values (i.e., the absolute difference value is greater than the fifth, sixth, and seventh threshold values Th5, Th6, and Th7). Thus, when the value counted is less than the second threshold Th2, the third comparator 425 determines that the line $L_{i-1}$ does not have uniform pixel values.

Figure 7:
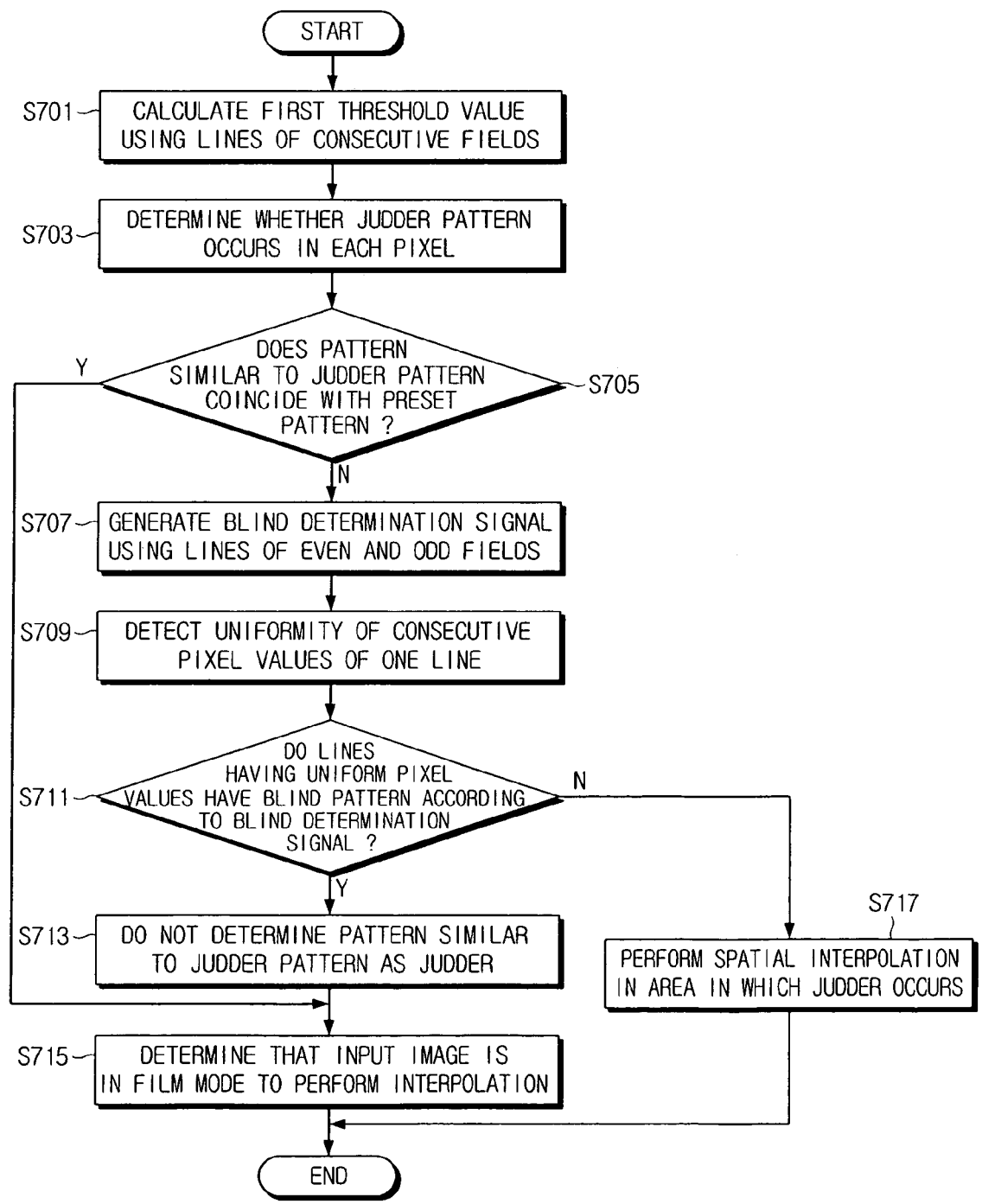
FIG. 7 is a flowchart illustrating a de-interlacing method using a judder detection apparatus according to an embodiment of the present general inventive concept.

FIG. 7 is a flowchart illustrating a de-interlacing method using judder detection according to an embodiment of the present general inventive concept. The method of FIG. 7 may be performed by the judder detection apparatus 700 of FIG. 1. Accordingly, the method of FIG. 7 is described below with reference to FIGS. 1, 2, 3A, and 5-7. Referring to FIG. 7, in operation S701, a first threshold value Th1 is calculated using pixel values of consecutive lines of even and odd fields that are sequentially input to determine whether a judder occurs in an input image.

An average value of pixel values of consecutive lines of the even field and an average value of pixel values of consecutive lines of the odd field are calculated. Pixels are selected from predetermined positions of predetermined lines of the even field, and the first average value calculator 213 calculates an average value of the selected pixels in the even field. Pixels are selected from predetermined positions of consecutive lines of the odd field, and the second average value calculator 215 calculates an average value of the selected pixels in the odd field.

The third calculator 217 calculates an absolute difference value between the average values of the even and odd fields. Here, the absolute difference value may be a difference value between pixels that is not enough to determine that the judder occurs in the two input fields (i.e., the even and odd fields) and may be determined to be the first threshold value Th1.

The first threshold value Th1 may be calculated using the two input fields, as described above, or may be a preset value. If the first threshold value Th1 calculated by the third calculator 217 is too large or too small to determine whether the judder occurs, the first threshold value Th1 calculated by the third calculator 217 may be compared with a predetermined value to correct the first threshold value Th1.

In operation S703, the judder detector 200 determines whether judders occur in pixels in predetermined positions of consecutive lines of the even and odd fields. The pixels are selected from the predetermined positions of the consecutive lines of the even and odd fields, and the first median filter 201 calculates a median value (i.e., a first median value) of the selected pixels.

Here, the pixels in the predetermined positions of the consecutive lines may be arranged in a vertical direction with respect to the consecutive lines. Since it is highly likely that judder occurs in the vertical direction, the pixels may be selected in the vertical direction with respect to of each of the consecutive lines. However, the pixels may be selected in the horizontal direction or a direction having a predetermined angle with respect to the horizontal direction. Here, the pixels in the predetermined positions of the consecutive lines are as described above with reference to FIGS. 3B and 3C.

A number of selected pixels may vary. However, use of an odd number of pixels makes the calculation of the first calculator 203 simple and more reliable, as described above with reference to FIGS. 2 and 3A.

The first calculator 203 calculates an absolute difference value between a pixel value of a pixel selected from a middle line of the consecutive lines and the median value calculated by the first median filter 201. For example, if three consecutive lines are selected, the absolute difference value between a pixel value of a second line of the three consecutive lines and the median value is compared with the first threshold value Th1 to determine whether a pixel of the second line has a pattern that is similar to a judder pattern. Here, the first threshold value Th1 may be calculated in operation S701 or may be preset and input to the first comparator 205.

If the absolute difference value calculated by the first calculator 203 is greater than the first threshold value Th1, a pixel selected from the middle line (i.e., the second line $L_i$) of the consecutive lines has a different pixel value from another selected pixel (e.g., a pixel of a first line or a pixel of a third line). Thus, in this case, the pixel selected from the middle line of the consecutive lines has a pattern that is similar to the judder pattern.

A process of determining whether judders occur in three pixels in the same position of three consecutive lines in a vertical direction of two input fields will now be described. Here, the three pixels include $L_{i-1}$, in a predetermined position of line i−1, $L_i$ positioned in line i, and $L_{i+1}$, positioned in line i+1.

A median value of the three pixels $L_{i-1}$, $L_i$, and $L_{i+1}$ in the same position in the vertical direction of the consecutive lines is calculated, and an absolute difference value between the median value and a pixel value of the pixel $L_i$ is calculated. If the absolute difference value is less than the first threshold value Th1, it may be determined that a pixel value of the pixel $L_i$ is similar to pixel values of the pixels $L_{i-1}$, and $L_{i+1}$. In this case, a judder is determined not to occur in the pixel $L_i$.

If the absolute difference value is greater than the first threshold value Th1, it may be determined that the pixel value of the pixel $L_i$ is different from the pixel values of the pixels $L_{i-1}$ and $L_{i+1}$. In this case, it may be determined that the pixel $L_i$ has a different pixel value from neighboring pixels and has a pattern that is similar to the judder.

Here, a judder is also generally likely to occur around an area in which the judder is determined to occur. Areas around a pixel in which a judder occurs may be determined as pixels in a predetermined area. Thus, the extension unit 221 determines that a judder occurs in the predetermined area around the pixel in which the judder occurs.

In operation S705, the analyzer 300 analyzes patterns that are similar to judders (i.e., detected judder pattern(s)) detected from pixels in predetermined positions of consecutive lines of the even and odd fields to determine whether the detected patterns that are similar to the judder pattern are generated by a motion of the input image. In other words, the analyzer 300 determines whether the detected judder pattern is actually judder generated by the motion of the input image or is generated by noise. Here, a pattern generated by noise may be preset in the analyzer 300. The pattern generated by noise may include a plurality of preset patterns to which the analyzer 300 compares the detected judder patterns. The pattern generated by the noise is described above with reference to FIGS. 4A through 4E.

The pattern generated by the noise is compared with the detected pattern that is similar to the detected judder pattern. If the pattern generated by the noise coincides with (i.e., matches) the detected pattern similar to the judder pattern, it is determined that the judder does not occur in the pixel, since the detected pattern that is similar to the judder pattern is a result of noise. If the pattern generated by the noise is erroneously determined as the judder, the interpolator 500 interpolates a field in which the noise occurs using information within the field and then displays an output image accordingly. Here, although the judder does not actually occur, the interpolator 500 erroneously determines that the judder does occur and does not combine two sequentially input fields to generate the output image, but instead performs the interpolation using the information within the field (e.g., a current field). As a result, quality of the image may deteriorate.

If the pattern that is similar to the detected judder pattern is determined not to be generated by the noise, in operation S707, a blind determination signal to determine whether two input fields have blind patterns using lines of the even and odd fields is generated. The blind patterns indicate that consecutive lines of the even and odd fields have similar pixel values in every other line and pixel values between the consecutive lines are different from each other. The blind determination signal indicates that a difference between pixels of the consecutive lines of the even and odd fields is greater than or equal to a predetermined value.

An average value of the pixels in consecutive lines of the even field and an average value of the pixels in consecutive lines of the odd field are calculated. An absolute difference value between the average values of the even and odd fields is calculated and compared with the fourth threshold value Th4 that is a predetermined value. If the absolute difference value is greater than the fourth threshold value Th4, a difference between pixel values of the consecutive lines of the even and odd fields is determined to be large. Thus, if the absolute difference value is less than the fourth threshold value Th4, the pixels in the consecutive lines are determined to have uniform pixel values, and the two input fields may be determined to have the blind patterns.

In operation S709, a detection is made as to whether predetermined lines of the even and odd fields have uniform pixel values, using consecutive pixels of each of the predetermined lines. The consecutive pixels of the predetermined lines of the even and odd fields are delayed in order to detect whether the predetermined lines have uniform pixel values. Here, a number of consecutive pixels used in the detection operation may be determined depending on a number of delayers that delay the consecutive pixels in the predetermined lines.

The detection operation used to detect whether a predetermined line has a uniform pixel value using three consecutive pixels by using two delayers will now be described. Here, a pixel of the predetermined line is referred to as S1, a pixel delayed from S1 is referred to as S2, and a pixel delayed from S2 is referred to as S3.

Absolute difference values of pixel values between the pixels S1 and S2, between the pixels S2 and S3, and between the pixels S3 and S1 are calculated. The absolute difference values are compared with a predetermined value. If the absolute difference values are greater than the predetermined value (e.g., the fifth threshold value Th5, the sixth threshold value Th6, and the seventh threshold value Th7, respectively), it is determined that the three consecutive pixels do not have the uniform pixel values. A number of pixels having non-uniform pixel values is then counted. If the counted number is less than or equal to a predetermined number (e.g. the second threshold value Th2), it is determined that the consecutive pixels of the predetermined line have uniform pixel values. Here, the predetermined line is one of the predetermined lines of the even and odd fields.

In operation S711, a determination is made as to whether the predetermined line having the uniform pixel values detected in the operation S709 has a blind pattern according to the blind determination signal generated in the operation S707. In other words, if the lines of the even and odd fields are detected as having the uniform pixel values in the operation S709, a determination is made as to whether two input fields (i.e., the odd and even fields) have blind patterns according to an absolute difference value of the uniform pixel values of the lines of the even and odd fields.

Although the lines of the even and odd fields having the uniform pixel values are detected, the absolute difference value of the pixel values of the lines of the even and odd fields may be small. In this case, the pixel values are not uniform in every other line, and may be the same in both the even and odd fields. Thus, it may be not determined that the even and odd fields have the blind patterns.

Therefore, a determination is made as to whether two sequentially input fields have blind patterns according to the blind determination signal generated in the operation S707 depending on whether the absolute difference value between the uniform pixel values of the lines of the even and odd fields is greater than a predetermined value (i.e., whether the absolute difference value is large). If the absolute difference value between the uniform pixel values of the lines of the even field and the uniform pixel values of the lines of the odd field is greater than the predetermined value it is determined that the uniform pixel value of pixels of the lines in the even field are different from the uniform pixel values of the lines in the odd fields and the blind pattern exists.

It is determined that the two sequentially input fields have the blind patterns when both the absolute difference value between the uniform pixel values of the lines of the even and odd fields is greater than the predetermined value, and the lines of the even and odd fields have the uniform pixel values.

If the blind patterns are detected from the even and odd fields, the judder is generated by the blind patterns according to the determination result produced in the operation S705. Thus, in operation S713, the determiner 500 determines that the judder is not detected. If the even and odd fields have the blind patterns, the judder detector 200 and the analyzer 300 may determine that judder occurs in the even and odd fields due to the similarity of the blind patterns to the judder pattern. Thus, although the even and odd fields have the blind patterns and the judder detector 200 and the analyzer 300 detect the judders, the determiner 500 determines that the judder does not occur.

If it is determined that the judder does not occur in the even and odd fields, in the operation 709, the interpolator 500 combines the even and odd fields to generate the output image. If the analyzer 300 determines in the operation S705 that the judder pattern detected by the judder detector 200 corresponds with the noise pattern (i.e., generated by the noise), the determiner 500 determines that the judder does not actually occur in the even and odd fields as a result of motion of the input image, i.e., the input image is in the film mode, to combine the even and odd fields so as to generate the output image.

If it is determined in the operation S711 that the even and odd fields do not have the blind patterns, in operation S717, a spatial interpolation is performed in the predetermined area in which the judder is determined to occur to generate the output image. In other words, an interpolation is performed in the predetermined area in which the judder occurs using information within the field that contains the judder (e.g., the current field) to be interpolated so as to generate the output image.

If the judder is detected in the even and odd fields, but the even and odd fields do not have the blind patterns, it may be determined that the detected judder is generated by the motion of the input image. Thus, if the even and odd fields are combined in the predetermined area of the field in which the judder occurs to generate the output image a distortion would occur. However, the spatial interpolation is performed to prevent the output image from being distorted.

As described above, in a judder detection apparatus, a de-interlacing apparatus using the judder detection apparatus, and a de-interlacing method according to various embodiments of the present general inventive concept, an erroneous determination that a judder occurs in an input image having a blind pattern can be prevented.

Once a detection is accurately made as to whether judder occurs in the input image, de-interlacing is performed. As a result, a high-quality image can be provided.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A judder detection apparatus, comprising:
a judder detector to detect a pattern and to determine whether the detected pattern is similar to a judder pattern using predetermined pixel values of even and odd fields sequentially input thereto;
a pattern detector to detect whether an input image has a uniform pixel value in every other line of the even and odd fields and whether consecutive lines of the even and odd fields have a blind pattern having a difference from the uniform pixel value that is greater than or equal to a threshold value; and
a determiner to determine whether the detected pattern that is similar to the judder pattern is actual judder based on whether the blind pattern is detected.

2. The judder detection apparatus of claim 1, wherein the judder detector comprises:

a first median filter to select predetermined pixels from the consecutive lines of the even and odd fields and to calculate a median value of the selected predetermined pixels;

a first calculator to calculate an absolute difference value between a pixel value of the selected predetermined pixels of a median line of the consecutive lines and the calculated median value; and a first comparator to compare the calculated absolute difference value with a first threshold value and if the calculated absolute difference value is greater than the first threshold value, to determine that the detected pattern is similar to the judder pattern.

3. The judder detection apparatus of claim 2, wherein if the calculated absolute difference value is greater than the first threshold value, the first comparator determines that a judder occurs in a pixel of the median line of the consecutive lines of the even and the odd fields.

4. The judder detection apparatus of claim 3, wherein the judder detector further comprises:

a first setter to calculate the first threshold value using the selected predetermined pixels.

5. The judder detection apparatus of claim 4, wherein the first setter comprises:

a first average value calculator to calculate an average value of the selected pixels of the even field;

a second average value calculator to calculate an average value of the selected pixels of the odd field; and a third calculator to calculate an absolute difference value between the average values calculated by the first and second average value calculators and to set the calculated absolute difference value as the first threshold value.

6. The judder detection apparatus of claim 5, wherein the first setter further comprises:

a corrector to compare the calculated absolute difference value with a preset predetermined value to correct the first threshold value.

7. The judder detection apparatus of claim 3, wherein the judder detector further comprises:

an extension unit to determine that a judder occurs in a predetermined area around a pixel in which the judder is detected if it is determined that the detected pattern is similar to the judder pattern.

8. The judder detection apparatus of claim 2, wherein the selected predetermined pixels are pixels positioned in a direction that forms a predetermined angle with horizontal lines of the even and odd fields.

9. The judder detection apparatus of claim 1, further comprising:

an analyzer to compare the detected pattern with a preset noise pattern to determine whether the detected pattern that is similar to the judder pattern occurs due to noise, if the detected pattern is similar to the judder pattern.

10. The judder detection apparatus of claim 1, wherein the pattern detector comprises:

a first line determiner to detect whether pixels of a predetermined line of the even field has uniform pixel values;

a second line determiner detect whether pixels of a predetermined line of the odd field has uniform pixel values;

a first counter to count a number of pixels detected by the first line determiner;

a second counter to count a number of pixels detected by the second line determiner;

a third comparator to compare the number of pixels counted by the first counter with a second threshold value to determine whether the predetermined line of the even field has a uniform pixel value;

a fourth comparator to compare the number of pixels counted by the second counter with a third threshold value to determine whether the predetermined line of the odd field has a uniform pixel value; and a selector to determine that the even and odd fields have blind patterns if it is determined that the predetermined lines of the even and odd fields have the uniform pixel values.

11. The judder detection apparatus of claim 10, wherein the first line determiner comprises:

a first delayer to delay a predetermined pixel of the predetermined line in the even field to output a first delayed pixel;

a second delayer to delay the first delayed pixel to output a second delayed pixel;

a fifth calculator to calculate an absolute difference value between a pixel value of the predetermined pixel and a pixel value of the first delayed pixel;

a sixth calculator to calculate an absolute difference value between the pixel value of the first delayed pixel and a pixel value of the second delayed pixel;

a seventh calculator to calculate an absolute difference value between the pixel value of the second delayed pixel and the pixel value of the predetermined pixel;

a sixth comparator to compare the absolute difference value calculated by the fifth calculator with a fifth threshold value to determine whether the predetermined pixel and the first delayed pixel have uniform pixel values;

a seventh comparator to compare the absolute difference value calculated by the sixth calculator with a sixth threshold value to determine whether the first and second delayed pixels have uniform pixel values; and an eighth comparator to compare the absolute difference value calculated by the seventh calculator with a seventh threshold value to determine whether the predetermined pixel and the second delayed pixel have uniform pixel values.

12. The judder detection apparatus of claim 10, wherein the pattern detector further comprises:

a second setter to compare an absolute difference value between pixel values of the even and odd fields with a fourth threshold value using the consecutive lines of the even and odd fields to determine whether pixel values between the consecutive lines of the even and odd fields are different from each other to determine whether to generate a blind determination signal.

13. The judder detection apparatus of claim 12, wherein the second setter comprises:

a third average value calculator to calculate an average value of pixels positioned in lines of the even field;

a fourth average value calculator to calculate an average value of pixels positioned in lines of the odd field;

a fourth calculator to calculate an absolute difference value between the average values calculated by the third and fourth average value calculators; and a fifth comparator to compare the absolute difference value calculated by the fourth calculator with the fourth threshold value, and if the calculated absolute difference value is greater than or equal to the fourth threshold value, the fifth comparator determines that the pixel values of the consecutive lines of the even and odd fields are different from each other and generates the blind determination signal.

14. The judder detection apparatus of claim 13, further comprising:
a selector to determine whether the even and odd fields have the blind patterns depending on the blind determination signal generated by the fifth comparator that determines that the pixel values of the consecutive lines of the even and odd fields are different from each other.

15. A judder detection apparatus, comprising:
a judder detector to detect pixel patterns of an image and to determine whether the detected pixel patterns match a judder pattern; and
an pattern detector/analyzer to determine whether the detected pixel patterns match one or more predetermined judder-like noise patterns when the detected pixel patterns are determined to match the judder pattern, to output a judder detection signal when the detected pixel patterns match the judder pattern and do not match the one or more judder-like noise patterns, and to output a non-judder detection signal when the detected pixel patterns do not match the judder pattern or when the detected pixel patterns match both the judder pattern and the one or more predetermined judder-like noise patterns.

16. The judder detection apparatus of claim 15, wherein the one or more predetermined judder-like noise patterns comprise preset noise patterns and blind patterns.

17. The judder detection apparatus of claim 16, wherein the pattern detector/analyzer comprises:
a pattern detector to detect whether the pixel patterns have the blind patterns; and
an analyzer to determine whether the pixel patterns match the preset noise patterns, and the judder detection apparatus further comprises:
a determiner to receive a blind pattern detection signal from the pattern detector and a noise pattern detection signal from the analyzer, to determine whether judder exists in the image according to the determinations of the judder detector, the pattern detector, and the analyzer, and to provide the judder determination to an interpolator.

18. The judder detection apparatus of claim 17, wherein the pattern detector detects the blind patterns by determining whether consecutive lines in neighboring fields of the image have uniform values by comparing a plurality of pixels in each of the consecutive lines and comparing average pixel values of each of the consecutive lines in the neighboring fields to each other.

19. The judder detection apparatus of claim 17, wherein the pattern detector comprises:
a plurality of line determiners to determine whether a plurality of lines have uniform values; and
a plurality of counters to determine a number of consecutive lines in an odd field that have a uniform pixel value and to determine a number of consecutive lines in an even field that have a uniform pixel value.

20. The judder detection apparatus of claim 19, wherein the pattern detector further comprises:
a setter to determine whether an average value of pixels of the consecutive lines in the odd field is different from an average value of pixels of the consecutive lines in the even field such that the pattern detector outputs the blind pattern detection signal when the average value of the pixels of the consecutive lines in the even field is different from the average value of the pixels of the consecutive lines in the odd field and the plurality of counters determine that the numbers of the consecutive lines in the odd field and the even field that have the uniform pixel value are each greater than a predetermined number.

21. A de-interlacing apparatus, comprising:
a judder detector to detect a pattern and to determine whether the detected pattern is similar to a judder pattern using predetermined pixel values of even and odd fields sequentially input;
a pattern detector to detect whether an input image has a uniform pixel value in every other line of the even and odd fields and whether consecutive lines have a blind pattern having a difference value from the uniform pixel value that is greater than or equal to a threshold value;
a determiner to determine whether the detected pattern that is similar to the judder pattern is actual judder based on whether the blind pattern is detected; and
an interpolator to interpolate the even and odd fields according to the determination of the determiner.

22. The de-interlacing apparatus of claim 21, wherein if the determiner determines that a judder occurs in the input image, the interpolator interpolates a field in which the judder occurs using a spatial interpolation using information within the field.

23. The de-interlacing apparatus of claim 21, wherein if the determiner determines that the judder does not occur in the input image, the interpolator generates an output image using information of both the even and odd fields.

24. The de-interlacing apparatus of claim 21 further comprising:
a field memory to store a plurality of fields of the input image.

25. A de-interlacing apparatus, comprising:
a judder detection apparatus to detect pixel patterns of an image, to determine whether the detected pixel patterns match a judder pattern, to determine whether the detected pixel patterns match one or more predetermined judder-like noise patterns when the detected pixel patterns are determined to match the judder pattern, to output a judder detection signal when the detected pixel patterns match the judder pattern and do not match the one or more determined judder-like noise patterns, and to output a non-judder detection signal when the detected pixel patterns do not match the judder pattern or when the detected pixel patterns match both the judder pattern and the one or more predetermined judder-like noise patterns.

26. A de-interlacing apparatus, comprising:
a judder detector to receive an image signal having a plurality of pixels and to detect a judder pattern;
a pattern determiner to determine whether the detected judder pattern is a result of at least one of noise and a blind pattern; and
an interpolator to interpolate the image using a temporal interpolation when the detected judder pattern is determined to be a result of the at least one of noise and the blind pattern, and to interpolate the image using a spatial interpolation when the detected judder pattern is determined not to be the result of the at least one of noise and the blind pattern.

27. A de-interlacing method, comprising:
detecting, with a judder detector, a pattern and determining whether the detected pattern is similar to a judder pattern using predetermined pixel values of even and odd fields sequentially input;
detecting, with a pattern detector, whether an input image has a uniform pixel value in every other line of the even and odd fields and detecting whether consecutive lines have a blind pattern by determining whether a difference value of the uniform pixel value is greater than or equal to a threshold value;

determining, with a determiner, whether the detected pattern is actual judder based on whether the blind pattern is detected when the detected pattern is determined to be similar to the judder pattern; and interpolating, with an interpolator, the even and odd fields according to the determination of whether the detected pattern that is similar to the judder pattern is the actual judder.

28. The de-interlacing method of claim 27, wherein the detecting of the pattern and the determining of whether the detected pattern is similar to the judder pattern using the predetermined pixel values of the even and odd fields sequentially input comprises:

selecting, with a first median filter, predetermined pixels from the consecutive lines of the even and odd fields and calculating a median value of the selected predetermined pixels;

calculating, with a first calculator, an absolute difference value between a pixel value of a pixel of a median line of the consecutive lines and the calculated median value of the selected pixels; and comparing, with a first comparator, the calculated absolute difference value with a first threshold value, and if the calculated absolute difference value is greater than the first threshold value, determining that the detected pattern is similar to the judder pattern.

29. The de-interlacing method of claim 28, wherein if the calculated absolute difference value is greater than the first threshold value, it is determined that a judder occurs in a pixel of the median line of the consecutive lines.

30. The de-interlacing method of claim 28, wherein the detecting of the pattern and the determining of whether the detected pattern is similar to the judder pattern using the predetermined pixel values of the even and odd fields sequentially input further comprises:

calculating, with a first setter, the first threshold value using the selected predetermined pixels.

31. The de-interlacing method of claim 30, wherein the calculating of the first threshold value comprises:

calculating, with a first average value calculator, an average value of the predetermined pixels selected from of the even field and calculating, with a second average value calculator, an average value of the predetermined pixels selected from the odd field; and calculating, with a third calculator, an absolute difference value between the average values of the predetermined pixels of the even and odd fields to set the calculated absolute difference value as the first threshold value.

32. The de-interlacing method of claim 30, wherein the calculating of the first threshold value further comprises:

comparing, with a corrector, the calculated absolute difference value with a preset predetermined value to correct the first threshold value.

33. The de-interlacing method of claim 28, wherein the detecting of the pattern and the determining of whether the detected pattern is similar to the judder pattern using the predetermined pixel values of the even and odd fields sequentially input further comprises:

if it is determined that the detected pattern is similar to the judder pattern, determining with an extension unit, that a judder occurs in a predetermined area around a pixel in which the judder is detected.

34. The de-interlacing method of claim 28, wherein the selected predetermined pixels are pixels positioned in a direction that forms a predetermined angle with horizontal lines of the even and odd fields.

35. The de-interlacing method of claim 27, further comprising:

if the detected pattern is similar to the judder pattern, comparing, with an analyzer, the detected pattern that is similar to the judder pattern with a preset noise pattern to determine whether the detected pattern occurs due to noise.

36. The de-interlacing method of claim 27, wherein the detecting of whether the input image has the uniform pixel value in every other line of the even and odd fields and the detecting of whether the consecutive lines have the blind pattern by determining whether the difference value from the uniform pixel that is greater than or equal to the threshold value comprises:

detecting, with a first line determiner, whether pixels of predetermined lines of the even fields have uniform pixel values, and determining, with a second line determiner whether pixels of predetermined lines of the odd fields have uniform pixel values;

counting, with a first counter, numbers of the pixels detected as having the uniform pixel values in the predetermined lines of the even fields, and counting, with a second counter, numbers of the pixels detected as having the uniform pixel values in the predetermined lines of the odd fields;

comparing, with a third comparator, the number of the pixels counted in the predetermined line of the even field with a second threshold value and comparing, with a fourth comparator, the number of the pixels counted in the predetermined line of the odd field with a third threshold value; and if it is determined that the predetermined lines of the even and odd fields have uniform pixel values greater than the second and third threshold values, respectively, determining, with a selector, that the even and odd fields have blind patterns.

37. The de-interlacing method of claim 36, wherein the detecting of whether the pixels of the predetermined lines of the even and odd fields have the uniform pixel values comprises:

delaying, with a first delayer, a predetermined pixel of the predetermined line to output a first delayed pixel and delaying, with a second delayer, the first delayed pixel to output a second delayed pixel;

calculating, with a fifth calculator, a first absolute difference value between pixel values of the predetermined pixel and the first delayed pixel, calculating, with a sixth calculator, a second absolute difference value between pixel values of the first and second delayed pixels, and calculating, with a seventh calculator, a third absolute difference value between pixel values of the second delayed pixel and the predetermined pixel; and comparing the first, second, and third absolute difference values with a threshold value to determine, with a sixth comparator, whether the predetermined pixel and the first delayed pixel have the uniform pixel values, with a seventh comparator, whether the first and second delayed pixels have the uniform pixel values, and with an eighth comparator, whether the predetermined pixel and the second delayed pixel have the uniform pixel values.

38. The de-interlacing method of claim 36, wherein the detecting of whether the input image has the uniform pixel value in every other line of the even and odd fields and the detecting of whether the consecutive lines have the blind pattern by determining the difference value from the uniform pixel that is greater than or equal to the threshold value further comprises:

comparing, with a second setter, a difference value between pixel values of the even and odd fields with a fourth threshold value using consecutive lines of the even and odd fields to determine whether the pixel values of the consecutive lines are different to determine whether to generate a blind determination signal.

39. The de-interlacing method of claim 38, wherein the determining of whether the pixel values of the consecutive lines are different comprises:

calculating, with a third average value calculator, an average value of pixel values of lines of the even field and calculating an average value of pixel values of lines of the odd field;

calculating, with a fourth average value calculator, an absolute difference value between the average values of the pixel values of the lines of the even and odd fields; and comparing, with a fifth comparator, the calculated absolute difference value with the fourth threshold value, and if the calculated absolute difference value is greater than or equal to the fourth threshold value, determining, with the fifth comparator, that the pixel values of the consecutive lines are different and generating the blind determination signal.

40. The de-interlacing method of claim 39, wherein a selection is made as to whether the even and odd fields have the blind patterns according to the blind determination signal generated by the determination that the pixel values of the consecutive lines are different.

41. The de-interlacing method of claim 27, wherein if it is determined that the judder occurs in the input image, a spatial interpolation is performed with respect to a field in which the judder occurs using information within the field.

42. The de-interlacing method of claim 27, wherein if it is determined that the judder does not occur in the input image, an output image is generated using information of the even and odd fields.

43. A de-interlacing method, the method comprising:
receiving an image signal having a plurality of pixels;
detecting a judder pattern with a judder detector;
determining, with a determiner, whether the detected judder pattern is a result of at least one of noise and a blind pattern; and
interpolating, with an interpolator, the image using a temporal interpolation when the detected judder pattern is determined to be a result of the at least one of noise and the blind pattern, and interpolating, with the interpolator, the image using a spatial interpolation when the detected judder pattern is determined not to be the result of the at least one noise and the blind pattern.

44. A method of detecting judder, the method comprising:
detecting, with a judder detector, pixel patterns of an image and determining whether the detected pixel patterns match a judder pattern;
determining, with a pattern detector/analyzer, whether the detected pixel patterns match one or more predetermined judder-like noise patterns when the detected pixel patterns are determined to match the judder pattern;
outputting a judder detection signal when the detected pixel patterns match the judder pattern and do not match the one or more predetermined judder-like noise patterns; and
outputting a non-judder detection signal when the detected pixel patterns do not match the judder pattern or when the detected pixel patterns match both the judder pattern and the one or more predetermined judder-like noise patterns.

45. The method of claim 44, wherein the one or more predetermined judder-like noise patterns comprise preset noise patterns and blind patterns.

46. The method of claim 45, wherein the determining of whether the detected pixel patterns match the one or more predetermined judder-like noise patterns comprises:

detecting, with a pattern detector, whether the pixel patterns have the blind patterns and providing a corresponding blind pattern detection signal;

determining, with an analyzer, whether the pixel patterns match the preset noise patterns and providing a noise pattern detection signal; and determining, with a determiner, whether judder exists in the image according to the blind pattern detection signal, the noise pattern detection signal, and the determination of whether the detected pixel patterns match the judder pattern.

47. The method of claim 46, wherein the determining of whether the detected pixel patterns match the one or more predetermined judder-like noise patterns comprises;

detecting, with the pattern detector, the blind patterns by determining whether consecutive lines in neighboring fields of the image have uniform values by comparing a plurality of pixels in each of the consecutive lines and comparing average pixel values of each of the consecutive lines in the neighboring fields to each other.

48. The method of claim 46, wherein the detecting of whether the pixel patterns have the blind patterns comprises:
determining, with a plurality of line determiners, whether a plurality of lines have uniform values; and
counting, with a plurality of counters, a number of consecutive lines in an odd field that have a uniform pixel value and counting a number of consecutive lines in an even field that have a uniform pixel value.

49. The method of claim 46, wherein the detecting of whether the pixel patterns have the blind patterns further comprises:
determining, with a setter, whether an average value of pixels of the consecutive lines in the odd field is different from an average value of pixels of the consecutive lines in the even field such that the blind pattern detection signal is output when the average value of the pixels of the consecutive lines in the even field is different from the average value of the pixels of the consecutive lines in the odd field and the plurality of counters determine that the numbers of the consecutive lines in the odd field and the even field that have the uniform pixel value are each greater than a predetermined number.

* * * * *